United States Patent
Takahara

(10) Patent No.: US 7,836,227 B2
(45) Date of Patent: Nov. 16, 2010

(54) COMPUTER-READABLE RECORDING MEDIUM HAVING COMMUNICATION PROGRAM RECORDED THEREON, COMMUNICATION APPARATUS, AND COMMUNICATION METHOD

(75) Inventor: Koji Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 12/264,554

(22) Filed: Nov. 4, 2008

(65) Prior Publication Data

US 2009/0138642 A1    May 28, 2009

(30) Foreign Application Priority Data

Nov. 28, 2007   (JP)   ............................. 2007-307913

(51) Int. Cl.
*G06F 3/00*      (2006.01)
*G06F 13/00*    (2006.01)

(52) U.S. Cl. ........................... 710/48; 710/260; 709/250

(58) Field of Classification Search ............. 710/46–50, 710/260–267; 709/212, 250
See application file for complete search history.

(56) References Cited

U.S. PATENT DOCUMENTS

| 6,115,776 | A  | * | 9/2000 | Reid et al. | ................... | 710/260 |
| 6,434,651 | B1 | * | 8/2002 | Gentry, Jr. | ................... | 710/260 |
| 6,988,156 | B2 | * | 1/2006 | Musumeci | ................... | 710/260 |
| 7,426,589 | B2 | * | 9/2008 | Oh | .............................. | 710/47 |
| 2003/0200368 | A1 | * | 10/2003 | Musumeci | ................... | 710/260 |

FOREIGN PATENT DOCUMENTS

JP        A 1-282643      11/1989

* cited by examiner

*Primary Examiner*—Christopher B Shin
(74) *Attorney, Agent, or Firm*—Greer, Burns & Crain, Ltd.

(57) ABSTRACT

A communication program causes a computer to perform communication processing of received packets in response to reception of interrupt processing, the interruption processing being a packet reception notification after the lapse of a predetermined holding time. The communication program causes the computer to perform a packet counting process of counting the number of received packets received per unit time, and a parameter value changing process of changing, based on a counting result of the packet counting process, a timer parameter value for determining the time packets are held before processing.

8 Claims, 14 Drawing Sheets

FIG. 3

| THE NUMBER OF PACKETS (packets/s) | CPU USAGE RATE (TIMER PARAMETER VALUE: μs) | | | | | | | | | |
|---|---|---|---|---|---|---|---|---|---|---|
| | 0 | 10 | 20 | 30 | 40 | 50 | 60 | 70 | 80 | 90 |
| 0~999 | 0% | 0% | 0% | 0% | | | | | | 0% |
| 1000~1999 | 2% | 2% | 2% | 0% | | | | | | 0% |
| 2000~2999 | 4% | 4% | 2% | 2% | | | | | | 0% |
| ... | | ... | | | | ... | | | | |
| 30000~30999 | 67% | 67% | 50% | 50% | | | | | | 20% |
| ... | | ... | | | | | | | | ... |
| 50000~50999 | 100% | 83% | 78% | 70% | | | | | | 50% |
| ... | | ... | | | | | | | | ... |
| 99000 or more | 100% | 100% | 100% | 100% | | | | | | 100% |

FIG. 7

| TIMER PARAMETER VALUE | 0 | 10 | 20 | 30 | 40 | 50 | 60 | 70 | 80 | 90 |
|---|---|---|---|---|---|---|---|---|---|---|
| CPU USAGE RATE | 100% | 75% | 66% | 61% | 60% | 56% | 54% | 54% | 52% | 55% |

FIG. 8

| | i | t1 | t2 | w1 | w2 | sum |
|---|---|---|---|---|---|---|
| (1) | 0 | 0 | 0 | 0 | 0 | 0 |
| (2) | 0 | 0 | 0 | 0 | 10 | 10 |
| (3) | 0 | 0 | 10 | 0 | 10 | 20 |
| (4) | 0 | 0 | 10 | 10 | 10 | 30 |
| (5) | 1 | 10 | 10 | 10 | 10 | 30 |
| (6) | 1 | 10 | 10 | 20 | 10 | 40 |
| (7) | 2 | 10 | 10 | 20 | 10 | 40 |
| (8) | 2 | 10 | 10 | 20 | 20 | 50 |
| (9) | 50 | 250 | 250 | 500 | 250 | 1000 |

FIG. 13

| THE NUMBER OF PACKETS (packets/s) | TIMER PARAMETER |
|---|---:|
| 0~999 | 0 |
| 1000~1999 | 0 |
| 2000~2999 | 0 |
| ... | ... |
| 30000~30999 | 0 |
| ... | ... |
| 50000~50999 | 20 |
| ... | ... |
| 99000 or more | 90 |

COMPUTER-READABLE RECORDING MEDIUM HAVING COMMUNICATION PROGRAM RECORDED THEREON, COMMUNICATION APPARATUS, AND COMMUNICATION METHOD

BACKGROUND OF THE INVENTION

1. Field of the Invention

The present invention relates to a computer-readable recording medium having a communication program recorded thereon, a communication apparatus, and a communication method.

2. Description of the Related Art

Conventionally, there is a communication apparatus provided with a network adapter that receives packets flowing in a network and a network driver that controls operation of the network adapter.

Specifically, when the network adapter first receives packets, it waits during a holding time that is set as a timer parameter. After the lapse of the holding time, the network adapter performs interruption processing sending an interrupt to a communication program provided with the network driver, and thereby notifies the communication program of the packet reception. The communication program receives the packet reception notification from the interrupt processing and temporarily disables interrupt processing of the network adapter, and the network driver performs communication processing of the received packets. The timer parameter is set as a fixed value before the processing starts.

After finishing the packet communication processing, the communication program queries the network adapter whether or not packets have been received during the execution of the interrupt disable processing for the network adapter and the packet communication processing. If the communication program receives a query result from the network adapter indicating that packets have been received, it also performs communication processing of the packets received by the network adapter during the execution of the interrupt disable processing for the network adapter and the packet communication processing. If the communication program receives a query result from the network adapter indicating that no packets have been received, it enables interrupt processing for the network adapter and waits for a packet reception notification from the network adapter.

A problem with the above conventional technique has been that the speed of response to packet reception decreases.

That is, with a large value set as the fixed-value timer parameter, the packet communication processing is started only after the lapse of the holding time according to the timer parameter even when a small number of packets are received per unit time. As a result, a problem with the conventional technique has been that the speed of response to packet reception decreases because of a delay in packet transmission and reception.

SUMMARY

Thus, a communication program, communication apparatus, and communication method have been made in order to solve the above problem with the conventional technique, and it is an object to provide the communication program, communication apparatus, and communication method capable of increasing the speed of response to packet reception.

To solve the above problem and achieve the object, the present communication program causes a computer to perform communication processing of received packets in response to reception of interrupt processing. The interruption processing is performed by a network adapter as a packet reception notification after the lapse of a predetermined holding time. The communication program causes the computer to perform a packet counting process of counting the number of packets received by the network adapter per unit time, and a parameter value changing process of changing, based on a counting result of the packet counting process, a timer parameter value for determining the holding time.

BRIEF DESCRIPTION OF THE DRAWINGS

FIG. 3 is a diagram showing exemplary information stored in a simulation result storage unit;

FIG. 7 is a diagram showing exemplary information stored in a calculation result storage unit;

FIG. 8 is a diagram for describing exemplary CPU usage rate calculation processing by a CPU usage rate calculation unit;

FIG. 13 is a diagram showing exemplary information stored in the simulation result storage unit according to a fourth embodiment.

DETAILED DESCRIPTION OF THE PREFERRED EMBODIMENTS

Embodiments of a communication program, communication apparatus, and communication method according to the present invention will be described in detail below with reference to the accompanying drawings. In the following description, the communication apparatus to which the present invention is applied will be described as the embodiments.

First Embodiment

In a first embodiment below, description will be given sequentially about the outline and characteristics of the communication apparatus according to the first embodiment, the configuration of the communication apparatus, the flow of processing by the communication apparatus, and finally advantages of the first embodiment.

[Outline and Characteristics of Communication Apparatus According to First Embodiment]

First, the outline and characteristics of the communication apparatus according to the first embodiment will be described with reference to FIG. 1.

A network adapter of the communication apparatus according to the first embodiment performs interrupt processing for a control unit as a packet reception notification after the lapse of a predetermined holding time. The control unit of the communication apparatus according to the first embodiment generally performs communication processing of received packets in response to reception of the interrupt processing and is mainly characterized by increasing the speed of response to packet reception.

Figure 1:
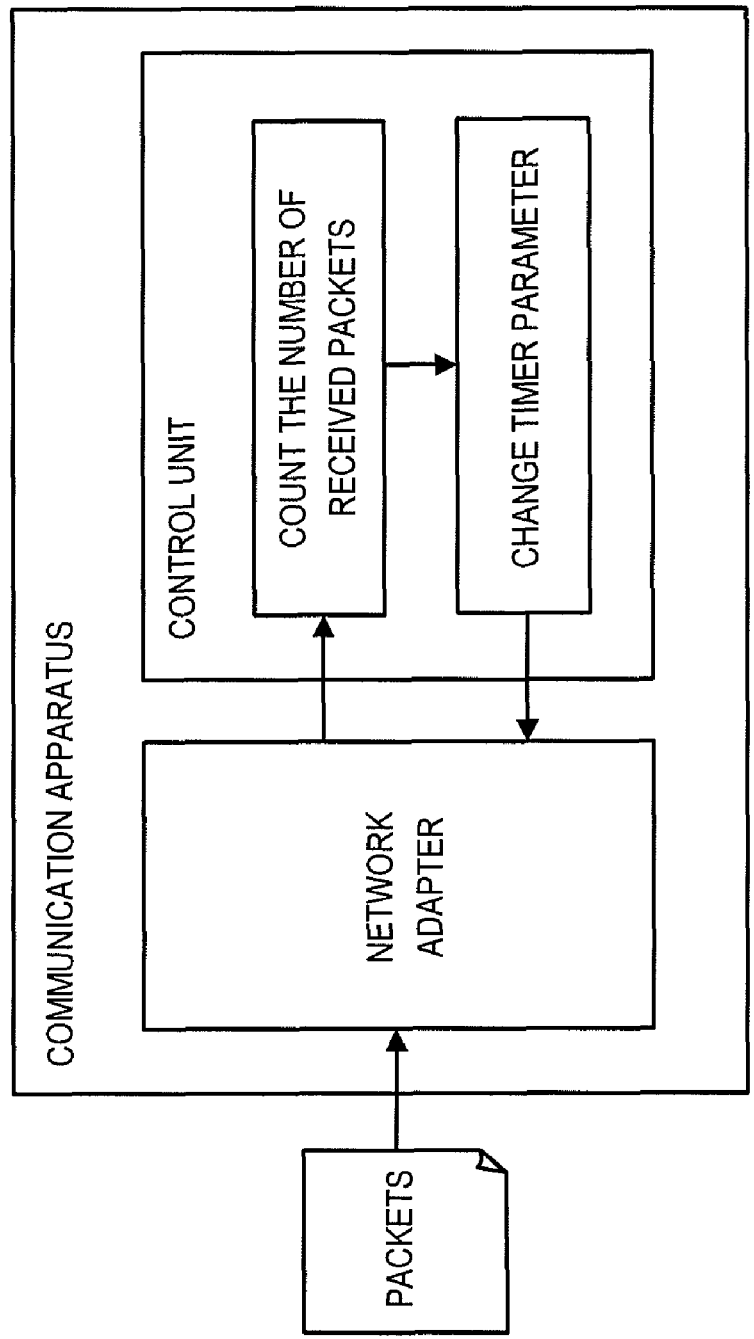
FIG. 1 is a diagram for describing the outline and characteristics of a communication apparatus according to a first embodiment.

Specifically, as shown in FIG. 1, the communication apparatus according to the first embodiment counts the number of received packets received by the network adapter per unit time and, based on the counting result, changes a timer parameter value for determining the holding time.

In detail, the communication apparatus according to the first embodiment changes the timer parameter value to a smaller value if the counting result is smaller than a preset target number of packets, which is the target value to be processed per unit time, and changes the timer parameter value to a larger value if the counting result is larger than the target number of packets.

In this manner, the communication apparatus according to the first embodiment can increase the speed of response to packet reception as indicated by the aforementioned main characteristic. The communication apparatus according to the first embodiment can also reduce an excessive load on a CPU.

[Configuration of Communication Apparatus]

Figure 2:
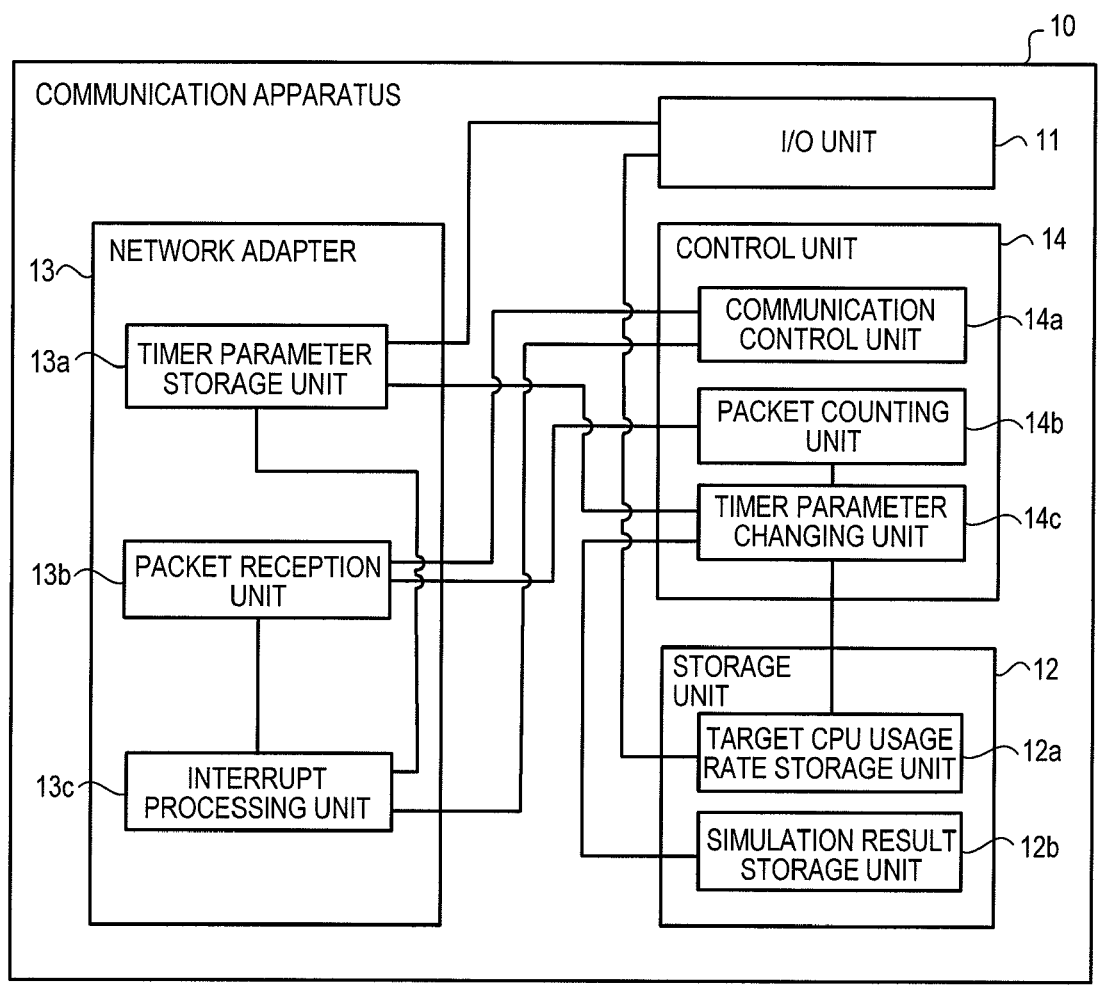
FIG. 2 is a block diagram showing the configuration of the communication apparatus.

Now, the configuration of the communication apparatus 10 shown in FIG. 1 will be described with reference to FIGS. 2 and 3. FIG. 2 is a block diagram showing the configuration of the communication apparatus. FIG. 3 is a diagram showing exemplary information stored in a simulation result storage unit. As shown in FIG. 2, the communication apparatus 10 includes an I/O unit 11, a storage unit 12, a network adapter 13, and a control unit 14.

Among these units, the I/O unit 11 inputs and outputs various kinds of information. Specifically, the I/O unit 11 includes a keyboard, mouse, microphone, display, and so on. For example, the I/O unit 11 writes a target CPU usage rate received from a user to a target CPU usage rate storage unit 12a to be described later, and writes an initial timer parameter value to a timer parameter storage unit 13a to be described later. The way of inputting the target CPU usage rate and the initial timer parameter value does not limit the present invention. For example, the target CPU usage rate input by means of a predetermined application may be subjected to protocol conversion and written to the target CPU usage rate storage unit 12a to be described later. Alternatively, a conventional technique may be used in which the values are written to the target CPU usage rate storage unit 12a and the timer parameter storage unit 13a by a driver using ioctl or the like.

The storage unit 12 stores data and program necessary for various kinds of processing performed by the control unit 14, and includes the target CPU usage rate storage unit 12a and the simulation result storage unit 12b.

The target CPU usage rate storage unit 12a stores the target CPU usage rate input by the user via the I/O unit 11. The target CPU usage rate is the target value (e.g., 80%) of the CPU usage rate used in timer parameter changing processing performed by the control unit 14. A simulation result is, for example, a value determined by means of a program that simulates the actual communication apparatus with respect to what CPU usage rate is obtained for a certain parameter value in the case of the smallest number of packets in a certain packet quantity range.

As the result of the simulation in which the CPU usage rate for each of varied timer parameter values is measured for each of packet quantity ranges defined at predetermined intervals, the simulation result storage unit 12b stores the CPU usage rate for each timer parameter value in association with each packet quantity range.

This will be described with a specific example. As shown in FIG. 3, the simulation result storage unit 12b stores, as the simulation result, the CPU usage rate "0%" for the timer parameter value set to "0," the CPU usage rate "0%" for the timer parameter value set to "10," the CPU usage rate "0%" for the timer parameter value set to "20," the CPU usage rate "0%" for the timer parameter value set to "30," . . . , and the CPU usage rate "0%" for the timer parameter value set to "90," in association with the packet quantity range "0 to 999."

As with the packet quantity range "0 to 999," the simulation result storage unit 12b stores, as the simulation result, the CPU usage rate for each timer parameter value in association with each of the packet quantity ranges defined at intervals of 1000 packets (e.g., "1000 to 1999," "2000 to 2999," . . . , "30000 to 30999," . . . , "50000 to 50999," . . . , and "99000 or more").

The packet quantity range represents the number of received packets per second (packets/s), and the CPU usage rate is the measurement result of the simulation of measuring the CPU usage rate.

The network adapter 13 receives packets flowing in the network and includes the timer parameter storage unit 13a, a packet reception unit 13b, and an interrupt processing unit 13c.

The timer parameter storage unit 13a stores the timer parameter value for determining the holding time from reception of packets to execution of interrupt processing. Specifically, the timer parameter storage unit 13a stores the initial timer parameter value (e.g., 90 microseconds) input by the user via the I/O unit 11. The timer parameter value stored in the timer parameter storage unit 13a is overwritten by the control unit 14.

The packet reception unit 13b receives packets from outside the communication apparatus 10. Specifically, when the packet reception unit 13b receives packets from outside the communication apparatus 10, it notifies the control unit 14 of the number of received packets and also requests the interrupt processing unit 13c to perform interrupt processing. When the packet reception unit 13b receives a query from the control unit 14 as to whether or not packets have been received during the execution of interrupt disable processing and packet communication processing, it sends a reply as a query result indicating whether or not packets have been received.

The interrupt processing unit 13c performs interrupt processing as a packet reception notification after the lapse of the predetermined holding time. Specifically, when the interrupt processing unit 13c receives an interrupt processing request from the packet reception unit 13b, it determines whether or not an interrupt processing disable request has been received from the control unit 14. If the interrupt processing unit 13c determines that the interrupt processing disable request has not been received, it reads the timer parameter value from the timer parameter storage unit 13a and holds interrupt processing for the holding time determined by the timer parameter value. After the lapse of the holding time, the interrupt processing unit 13c performs the interrupt processing as a packet reception notification for the control unit 14. If the interrupt processing unit 13c determines that the interrupt processing disable request has been received, it simply terminates the processing.

The control unit 14 has internal memory for storing a control program such as an OS (Operating System), programs defining various procedures and so on, and necessary data, which are used by the control unit 14 to perform various kinds of processing. The control unit 14 includes a communication control unit 14a, a packet counting unit 14b, and a timer parameter changing unit 14c.

The communication control unit 14a performs communication processing of received packets. Specifically, when the communication control unit 14a receives interrupt processing as a packet reception notification from the interrupt processing unit 13c, it sends an interrupt processing disable request to the interrupt processing unit 13c. The communication control unit 14a then reads from the network adapter 13 packets received by the packet reception unit 13b and performs communication processing of the received packets.

After finishing the packet communication processing, the communication control unit 14a queries the packet reception unit 13b as to whether or not packets have been received during the execution of the interrupt disable processing for the interrupt processing unit 13c and the packet communication processing. If the communication control unit 14a receives a query result from the packet reception unit 13b indicating that packets have been received, it also reads from the network adapter 13 the packets received by the packet reception unit 13b during the execution of the interrupt disable processing for the interrupt processing unit 13c and the packet communication processing, and performs communication processing of the received packets.

If the communication control unit 14a receives a query result from the packet reception unit 13b indicating that no packets have been received, it enables interrupt processing for the interrupt processing unit 13c and waits for interrupt processing as a packet reception notification from the interrupt processing unit 13c.

The packet counting unit 14b counts the number of received packets received by the network adapter. Specifically, the packet counting unit 14b receives a notification of the number of received packets from the packet reception unit 13b and counts the number of received packets by cumulatively adding the number of received packets. When the cumulative number of received packets reaches a predetermined value (e.g., 1000 or more), the packet counting unit 14b calculates "the number of packets per unit time," which is a value obtained by dividing "the cumulative number of received packets" by "the time it took for the cumulative number of received packets to reach the predetermined value from the start of counting the number of received packets." This value is sent as the counting result to the timer parameter changing unit 14c.

The timer parameter changing unit 14c changes the timer parameter value for determining the holding time. Specifically, based on the simulation result stored in the simulation result storage unit 12b, the timer parameter changing unit 14c changes the timer parameter value to a value reflecting the counting result of the packet counting unit 14b and the CPU usage rate.

To describe with a specific example, when the timer parameter changing unit 14c receives the counting result (the counting result indicating that 50000 packets were received per second) from the packet counting unit 14b, it reads the target CPU usage rate (80%) from the target CPU usage rate storage unit 12a.

The timer parameter changing unit 14c then selects the packet quantity range "50000 to 50999" corresponding to the counting result from the simulation result stored in the simulation result storage unit 12b. The timer parameter changing unit 14c further compares the CPU usage rate ("100%," "83%," "78%," "70%," . . . , "50%") corresponding to each timer parameter value for the selected packet quantity range "50000 to 50999" with the target CPU usage rate. The smallest timer parameter value ("20") corresponding to a CPU usage rate lower than the target CPU usage rate is determined as the timer parameter value to be set. If all the CPU usage rates corresponding to the counting result are higher than the target CPU usage rate, the timer parameter changing unit 14c determines the largest timer parameter value ("90") as the timer parameter value to be set. Hereafter, this determined timer parameter value will be referred to as a determined timer parameter value.

The timer parameter changing unit 14c then determines whether or not the timer parameter value stored in the timer parameter storage unit 13a is equal to the determined timer parameter value. If not, the timer parameter changing unit 14c overwrites the timer parameter value stored in the timer parameter storage unit 13a with the determined timer parameter value.

The timer parameter changing unit 14c changes the cumulative number of received packets of the packet counting unit 14b to "0" and causes the counting of received packets to be resumed.

[Communication Processing by Communication Apparatus]

Figure 4:
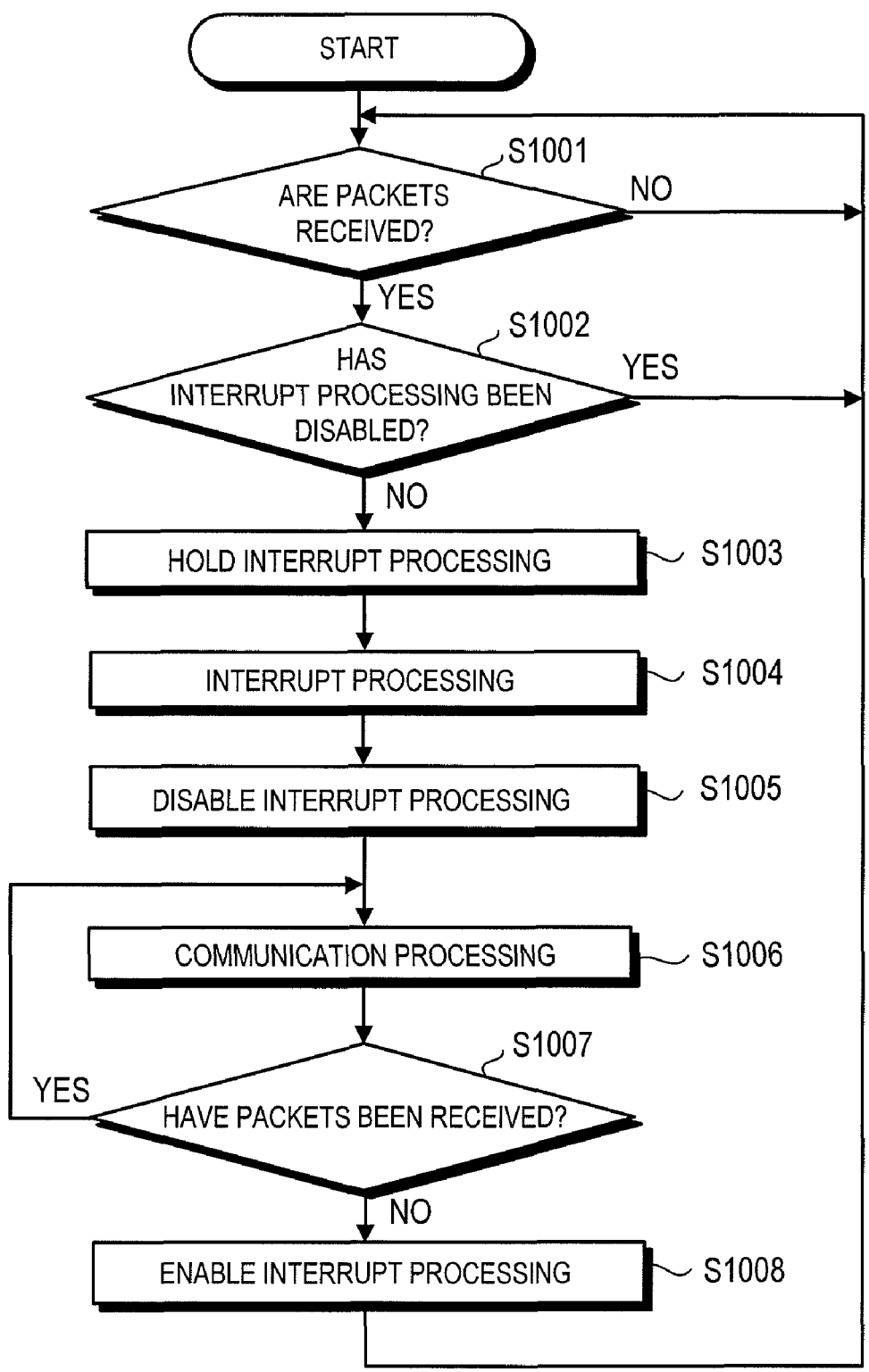
FIG. 4 is a flowchart showing the flow of communication processing by the communication apparatus.

Now, the communication processing by the communication apparatus 10 will be described with reference to FIG. 4. FIG. 4 is a flowchart showing the flow of the communication processing by the communication apparatus. The communication processing by the communication apparatus 10 terminates as the communication apparatus 10 stops running.

As shown in FIG. 4, when the communication apparatus 10 receives packets from outside the communication apparatus 10 (Yes in step S1001), it determines whether or not interrupt processing has been disabled (step S1002). Specifically, when the packet reception unit 13b receives packets from outside the communication apparatus 10, it notifies the control unit 14 of the number of received packets and also requests the interrupt processing unit 13c to perform interrupt processing. The interrupt processing unit 13c determines whether or not an interrupt processing disable request has been received from the control unit 14.

If the communication apparatus 10 determines that interrupt processing has been disabled (Yes in step S1002), it again waits for reception of packets (step S1001).

If the communication apparatus 10 determines that interrupt processing has not been disabled (No in Step S1002), it holds the interrupt processing for the holding time determined by the timer parameter value (step S1003). After the lapse of the holding time, the communication apparatus 10 performs the interrupt processing as a packet reception notification (step S1004). Specifically, the interrupt processing unit 13c reads the timer parameter value from the timer parameter storage unit 13a and holds the interrupt processing for the holding time determined by the timer parameter value. After the lapse of the holding time, the interrupt processing unit 13c performs the interrupt processing as a packet reception notification for the control unit 14.

The communication apparatus 10 then disables interrupt processing (step S1005) and performs communication processing of the received packets (step S1006). Specifically, the communication control unit 14a sends an interrupt processing disable request to the interrupt processing unit 13c, reads from the network adapter 13 the packets received by the packet reception unit 13b, and performs the communication processing of the received packets.

The communication apparatus 10 then determines whether or not packets have been received during the execution of the interrupt disable processing and the packet communication processing (step S1007). Specifically, the communication control unit 14a queries the packet reception unit 13b as to whether or not packets have been received, and the packet reception unit 13b sends a reply as a query result indicating whether or not packets have been received.

If the communication apparatus 10 determines that packets have been received during the execution of the interrupt disable processing and the packet communication processing (Yes in step S1007), it also performs communication processing of the received packets received during the execution of the interrupt disable processing and the packet communication processing (step S1006). Specifically, the communication control unit 14a also reads from the network adapter 13 the packets received by the packet reception unit 13b during the execution of the interrupt disable processing for the interrupt processing unit 13c and the packet communication processing, and performs the communication processing of the received packets.

If the communication apparatus 10 determines that no packets have been received during the execution of the interrupt disable processing and the packet communication processing (No in step S1007), it enables interrupt processing (step S1008) and again waits for reception of packets (step S1001). Specifically, the communication control unit 14a enables interrupt processing for the interrupt processing unit 13c and waits for interrupt processing as a packet reception notification from the interrupt processing unit 13c.

[Timer Parameter Changing Processing by Communication Apparatus]

Figure 5:
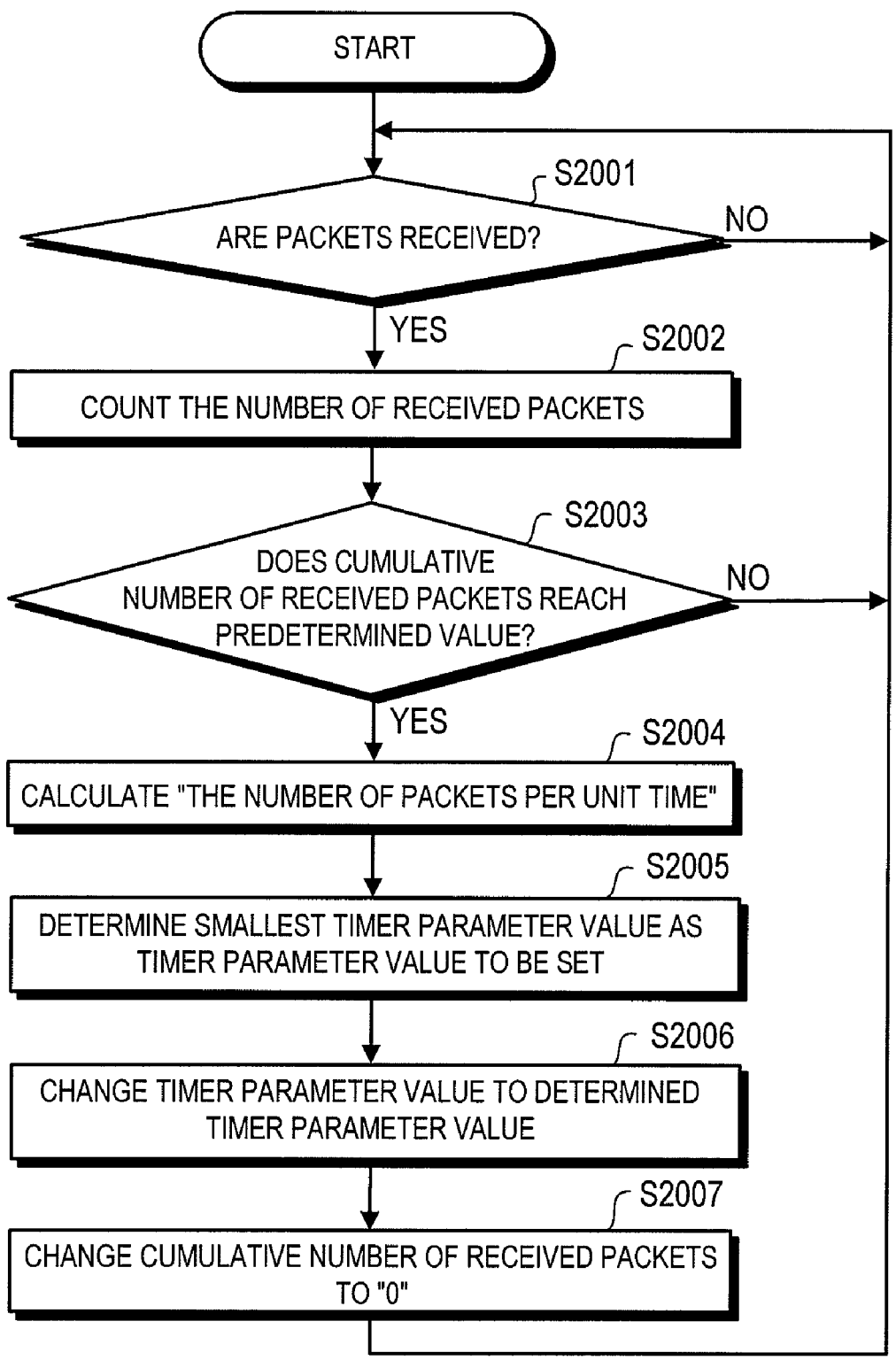
FIG. 5 is a flowchart showing the flow of timer parameter changing processing by the communication apparatus.

Now, the timer parameter changing processing by the communication apparatus 10 will be described with reference to FIG. 5. FIG. 5 is a flowchart showing the flow of the timer parameter changing processing by the communication apparatus. The timer parameter changing processing by the communication apparatus 10 terminates as the communication apparatus 10 stops running.

As shown in FIG. 5, when the communication apparatus 10 receives packets from outside the communication apparatus 10 (Yes in step S2001), it counts the number of received packets (step S2002). Specifically, when the packet reception unit 13b receives packets from outside the communication apparatus 10, it notifies the control unit 14 of the number of received packets, and the packet counting unit 14b counts the number of received packets by cumulatively adding the number of received packets.

If the cumulative number of received packets does not reach a predetermined value (No in step S2003), the communication apparatus 10 again waits for reception of packets (step S2001).

If the cumulative number of received packets reaches the predetermined value (Yes in step S2003), the communication apparatus 10 calculates "the number of packets per unit time" as the counting result (step S2004). Specifically, if the cumulative number of received packets reaches the predetermined value, the packet counting unit 14b calculates "the number of packets per unit time" and sends it as the counting result to the timer parameter changing unit 14c.

The communication apparatus 10 then determines, as the timer parameter value to be set, the smallest one of timer parameter values corresponding to CPU usage rates lower than the target CPU usage rate (step S2005).

Specifically, having received the counting result, the timer parameter changing unit 14c reads the target CPU usage rate from the target CPU usage rate storage unit 12a and selects a packet quantity range corresponding to the counting result from the simulation result stored in the simulation result storage unit 12b. The timer parameter changing unit 14c compares the CPU usage rate corresponding to each timer parameter value for the selected packet quantity range with the target CPU usage rate and determines, as the timer parameter value to be set, the smallest timer parameter value corresponding to a CPU usage rate lower than the target CPU usage rate.

The communication apparatus 10 changes the timer parameter value to the determined timer parameter value (step S2006), changes the counted cumulative number of received packets to "0" (step S2007), and again waits for reception of packets (step S2001). Specifically, the timer parameter changing unit 14c determines whether or not the timer parameter value stored in the timer parameter storage unit 13a is equal to the determined timer parameter value. If not, the timer parameter changing unit 14c overwrites the timer parameter value stored in the timer parameter storage unit 13a with the determined timer parameter value. Having overwritten the timer parameter value stored in the timer parameter storage unit 13a with the determined timer parameter value, the timer parameter changing unit 14c changes the cumulative number of received packets of the packet counting unit 14b to "0" and causes the counting of received packets to be resumed.

Advantages of First Embodiment

As described above, according to the first embodiment, the speed of response to packet reception can be increased.

Also according to the first embodiment, the speed of response to packet reception can be increased when a small number of packets are received per unit time, while an excessive load on the CPU can be reduced when a large number of packets are received per unit time.

Also according to the first embodiment, the speed of response to packet reception can be increased while limiting the CPU usage rate to a rate not higher than the target CPU usage rate.

Second Embodiment

While the first embodiment has been described for the case where the simulation result is used to change the timer parameter value, the present invention is not limited to it. Rather, the CPU usage rate may be calculated to change the timer parameter value.

Thus, a second embodiment will be described for the case where a counting result of the packet counting unit 14b is used to calculate the CPU usage rate and the timer parameter value is changed based on the result of calculation of the CPU usage rate. In the second embodiment, description will be given about the configuration of the communication apparatus according to the second embodiment and the flow of processing by the communication apparatus, followed by advantages of the second embodiment.

[Configuration of Communication Apparatus According to Second Embodiment]

Figure 6:
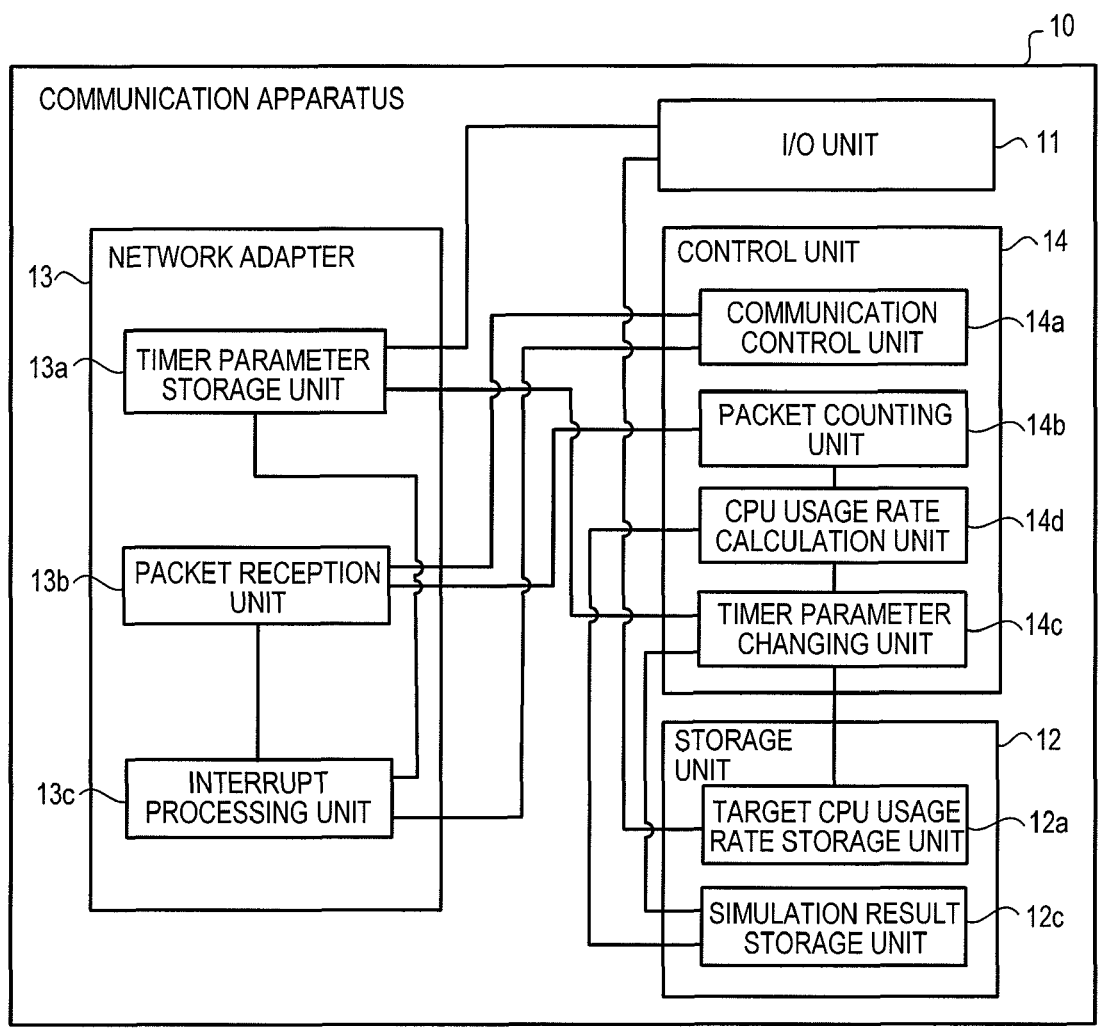
FIG. 6 is a block diagram showing the configuration of the communication apparatus according to a second embodiment.

First, the configuration of the communication apparatus 10 according to the second embodiment will be described with reference to FIGS. 6, 7, and 8. FIG. 6 is a block diagram showing the configuration of the communication apparatus according to the second embodiment. FIG. 7 is a diagram showing exemplary information stored in a calculation result storage unit. FIG. 8 is a diagram for describing exemplary CPU usage rate calculation processing by a CPU usage rate calculation unit. Besides additionally including the calculation result storage unit 12c and the CPU usage rate calculation unit 14d, the configuration of the communication apparatus 10 according to the second embodiment differs from the communication apparatus 10 according to the first embodiment in the points to be described below.

That is, the calculation result storage unit 12c stores the result of calculation of the CPU usage rate by the CPU usage rate calculation unit 14d. To describe with a specific example, as shown in FIG. 7, the calculation result storage unit 12c stores the CPU usage rate in association with each of timer parameter values (e.g., "0," "10," "20," . . . , "90").

When the cumulative number of received packets reaches a predetermined value (e.g., 1000 or more), the packet counting unit 14b calculates "the time required for receiving one packet" by dividing "the time it took for the cumulative number of received packets to reach the predetermined value from the start of counting the number of received packets" by "the cumulative number of received packets." This value is sent as the counting result to the CPU usage rate calculation unit 14d.

The CPU usage rate calculation unit 14d calculates the CPU usage rate for each timer parameter value based on the counting result of the packet counting unit 14b, a preset communication processing time required for communication processing, and a preset interrupt processing time required for interrupt processing.

Specifically, when the CPU usage rate calculation unit 14d receives "the time required for receiving one packet" as the counting result from the packet counting unit 14b, it calculates the CPU usage rate for each timer parameter value based on "the time required for receiving one packet," "the preset communication processing time required for communication processing," and "the preset interrupt processing time required for interrupt processing." The CPU usage rate calculation unit 14d stores the CPU usage rate for each timer parameter value as a calculation result in the calculation result storage unit 12c.

Here, exemplary CPU usage rate calculation processing by the CPU usage rate calculation unit 14d will be described with reference to FIG. 8, where "i" denotes a variable based on the number of packets, "t1" denotes a variable based on the interrupt processing time, "t2" denotes a variable based on the communication processing time required for communication processing of one packet, "w1" denotes a variable based on the holding time determined by the timer parameter value, "w2" denotes a variable based on the time during which the CPU is not performing processing, and "sum" denotes a variable varying with changes in the communication processing time, in the interrupt processing time, and in the holding time.

The processing in calculating the CPU usage rate will be described for the case where the counting result that "the time required for receiving one packet" is "20 microseconds" is received from the packet counting unit 14b, the communication processing time is set to "10 microseconds," the interrupt processing time is set to "10 microseconds," and the holding time determined by the timer parameter value is "10 microseconds."

When the CPU usage rate calculation unit 14d starts the CPU usage rate calculation processing, it sets all values of "i," "t1," "t2," "w1," "w2," and "sum" to "0" (see (1) in FIG. 8).

The CPU usage rate calculation unit 14d then adds the holding time "10 microseconds" to "w1" and adds the holding time "10 microseconds" to "sum" (see (2) in FIG. 8).

The CPU usage rate calculation unit 14d then adds the interrupt processing time "10 microseconds" to "t1" and adds the interrupt processing time "10 microseconds" to "sum" (see (3) in FIG. 8).

The CPU usage rate calculation unit 14d then adds the communication processing time "10 microseconds" to "t2" and adds the communication processing time "10 microseconds" to "sum" (see (4) in FIG. 8).

The CPU usage rate calculation unit 14d then adds "1" to "i" indicating that one packet has been processed (see (5) in FIG. 8).

The CPU usage rate calculation unit 14d then determines whether or not "sum" is equal to or greater than "1000 microseconds." In the example shown in (5) in FIG. 8, the CPU usage rate calculation unit 14d determines that "30 microseconds" ("sum") is not equal to or greater than "1000 microseconds." Therefore, it multiplies "1" ("i") by "20 microseconds" ("the time required for receiving one packet") to determine whether or not the product is equal to or greater than "sum."

In the example shown in (5) in FIG. 8, the CPU usage rate calculation unit 14d determines that the product "20 microseconds" is not equal to or greater than "30 microseconds" ("sum"). Therefore, it adds the communication processing time "10 microseconds" to "t2" and adds the communication processing time "10 microseconds" to "sum" (see (6) in FIG. 8).

The CPU usage rate calculation unit 14d then adds "1" to "i" indicating that one packet has been processed (see (7) in FIG. 8).

The CPU usage rate calculation unit 14d then determines whether or not "sum" is equal to or greater than "1000 microseconds." In the example shown in (7) in FIG. 8, the CPU usage rate calculation unit 14d determines that "40 microseconds" ("sum") is not equal to or greater than "1000 microseconds." Therefore, it multiplies "2" ("i") with "20 microseconds" ("the time required for receiving one packet") to determine whether or not the product is equal to or greater than "sum."

In the example shown in (7) in FIG. 8, the CPU usage rate calculation unit 14d determines that the product "40 microseconds" is equal to or greater than "40 microseconds" ("sum").

In this case, the CPU usage rate calculation unit 14d adds the difference of subtracting "sum" from "'i' multiplied by 'the time required for receiving one packet'" to "w2," and changes "sum" to "'i' multiplied by 'the time required for receiving one packet.'"

In the example shown in (7) in FIG. 8, the difference "0 microseconds" is added to "w2," and "sum" is changed to "40 microseconds" ("'i' multiplied by 'the time required for receiving one packet'").

Then, the CPU usage rate calculation unit 14d again adds the holding time "10 microseconds" to "w1" and adds the holding time "10 microseconds" to "sum" (see (8) in FIG. 8).

In this manner, the CPU usage rate calculation unit 14d performs the above processing until it determines that "sum" is equal to or greater than "1000 microseconds" (see (9) in FIG. 8). When the CPU usage rate calculation unit 14d determines that "sum" is equal to or greater than "1000 microseconds," it divides the accumulated value of "250 microseconds" ("t1") and "500 microseconds" ("t2") by "1000 microseconds" ("sum") to obtain the CPU usage rate (i.e., 75%). Thus, the processing in calculating the CPU usage rate for the case where the holding time determined by the timer parameter value is "10 microseconds" terminates.

The timer parameter changing unit 14c changes the timer parameter value based on the calculation result of the CPU usage rate calculation unit 14d. Specifically, the timer parameter changing unit 14c compares the CPU usage rate for each timer parameter value stored in the calculation result storage unit 12c with the target CPU usage rate and determines, as the timer parameter value to be set, the smallest timer parameter value ("10") corresponding to a CPU usage rate lower than the target CPU usage rate ("80%").

[Timer Parameter Changing Processing According to Second Embodiment]

Figure 9:
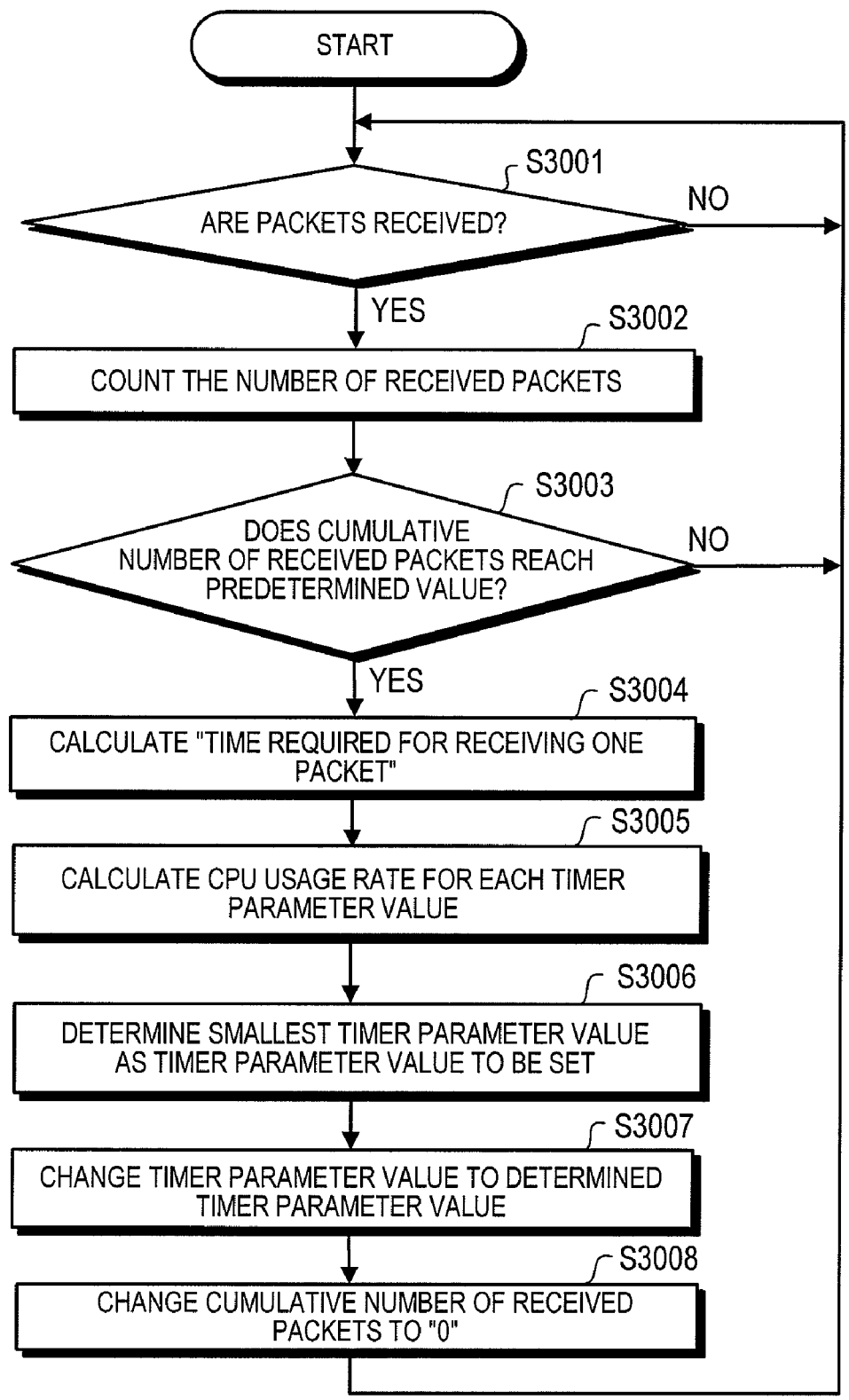
FIG. 9 is a flowchart showing the flow of the timer parameter changing processing according to the second embodiment.

Now, the timer parameter changing processing according to the second embodiment will be described with reference to FIG. 9. FIG. 9 is a flowchart showing the flow of the timer parameter changing processing according to the second embodiment. The timer parameter changing processing according to the second embodiment terminates as the communication apparatus stops running. Differences from the timer parameter changing processing according to the first embodiment will be described in detail.

As shown in FIG. 9, when the communication apparatus 10 receives packets from outside the communication apparatus 10 (Yes in step S3001), it counts the number of received packets (step S3002). If the cumulative number of received packets reaches a predetermined value (Yes in step S3003), the communication apparatus 10 calculates "the time required for receiving one packet" as the counting result (step S3004). Specifically, when the cumulative number of received packets reaches the predetermined value, the packet counting unit 14b calculates "the time required for receiving one packet" and sends it as the counting result to the CPU usage rate calculation unit 14d.

The communication apparatus 10 then calculates the CPU usage rate for each timer parameter value based on the counting result, the preset communication processing time required for communication processing, and the preset interrupt processing time required for interrupt processing (step S3005). Specifically, the CPU usage rate calculation unit 14d calculates the CPU usage rate for each timer parameter value based on "the time required for receiving one packet," the preset communication processing time required for communication processing, and the preset interrupt processing time required for interrupt processing. The CPU usage rate calculation unit 14d stores the CPU usage rate corresponding to each timer parameter value as the calculation result in the calculation result storage unit 12c.

The communication apparatus 10 then determines, as the timer parameter value to be set, the smallest one of timer parameter values corresponding to CPU usage rates lower than the target CPU usage rate (step S3006). Specifically, the timer parameter changing unit 14c compares the CPU usage rate corresponding to each timer parameter value stored in the calculation result storage unit 12c with the target CPU usage rate and determines, as the timer parameter value to be set, the smallest timer parameter value corresponding to a CPU usage rate lower than the target CPU usage rate.

The communication apparatus 10 changes the timer parameter value to the determined timer parameter value (step S3007), changes the counted cumulative number of received packets to "0" (step S3008), and again waits for reception of packets (step S3001).

[CPU Usage Rate Calculation Processing]

Figure 10:
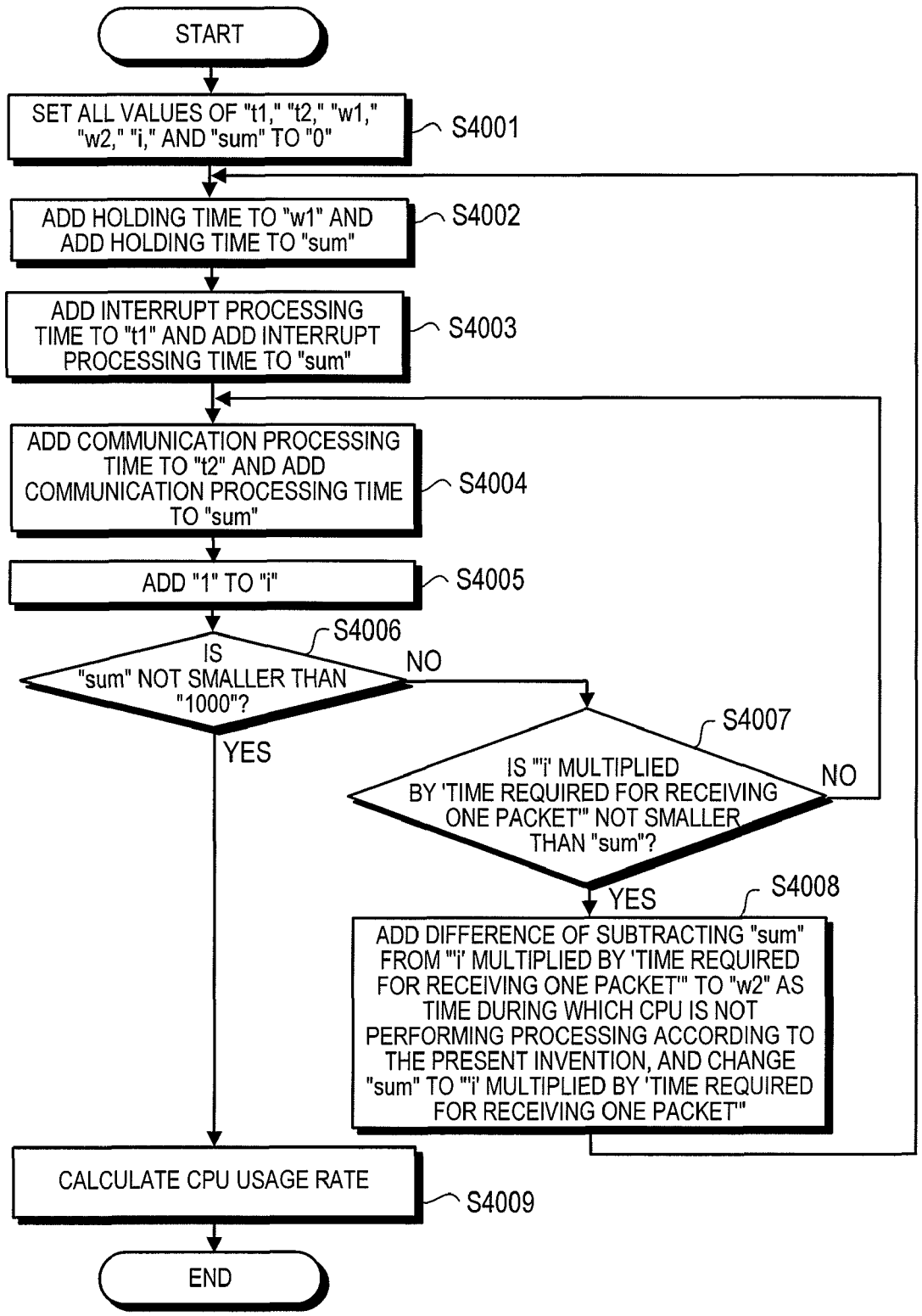
FIG. 10 is a flowchart showing the flow of the CPU usage rate calculation processing.

Now, the CPU usage rate calculation processing will be described with reference to FIG. 10. FIG. 10 is a flowchart showing the flow of the CPU usage rate calculation processing. The CPU usage rate calculation processing corresponds to step S3005 shown in FIG. 9.

As shown in FIG. 10, when the CPU usage rate calculation unit 14d starts the CPU usage rate calculation processing, it sets all values of "i," "t1," "t2," "w1," "w2," and "sum" to "0" (step S4001).

The CPU usage rate calculation unit 14d then adds the holding time to "w1" and adds the holding time to "sum" (step S4002).

The CPU usage rate calculation unit 14d then adds the interrupt processing time to "t1" and adds the interrupt processing time to "sum" (step S4003).

The CPU usage rate calculation unit 14d then adds the communication processing time to "t2" and adds the communication processing time to "sum" (step S4004).

The CPU usage rate calculation unit 14d then adds "1" to "i" indicating that one packet has been processed (step S4005).

The CPU usage rate calculation unit 14d then determines whether or not "sum" is equal to or greater than "1000 microseconds" (step S4006).

If the CPU usage rate calculation unit 14d determines that "sum" is not equal to or greater than "1000 microseconds" (No in step S4006), it multiplies "i" by "the time required for receiving one packet" to determine whether or not the product is equal to or greater than "sum" (step S4007).

If the CPU usage rate calculation unit 14d determines that the product is not equal to or greater than "sum" (No in step S4007), it again adds the communication processing time to "t2" and adds the communication processing time to "sum" (step S4004), and repeats the above processing (steps S4004 to S4007).

If the CPU usage rate calculation unit 14d determines that the product is equal to or greater than "sum" (Yes in step S4007), it adds the difference of subtracting "sum" from "'i' multiplied by 'the time required for receiving one packet'" to "w2," and changes "sum" to "'i' multiplied by 'the time required for receiving one packet'" (step S4008).

Then, the CPU usage rate calculation unit 14d again adds the holding time to "w1" and adds the holding time to "sum" (step S4002), and repeats the above processing (steps S4002 to S4008).

Returning to the description of step S4006, If the CPU usage rate calculation unit 14d determines that "sum" is equal to or greater than "1000 microseconds" (Yes in step S4006), it divides the accumulated value of "t1" and "t2" by "sum" to obtain the CPU usage rate (step S4009). Thus, the CPU usage rate calculation processing terminates.

Advantages of Second Embodiment

As described above, according to the second embodiment, the speed of response to packet reception can be increased based on the CPU usage rate calculated by using the number of received packets received by the network adapter.

Third Embodiment

While the first and second embodiments have been described for the case where the timer parameter value is dynamically changed, dynamic change of the timer parameter may not be supported at the hardware level. In this case, the timer parameter value can be changed after re-initialization at the hardware level.

However, the re-initialization at the hardware level often requires about several milliseconds to several seconds. Since packets cannot be transmitted or received during the re-initialization, frequent re-initialization at the hardware level may increase the number of lost packets, resulting in degraded network performance.

Thus, a third embodiment will be described for the case where the frequency of the re-initialization at the hardware level for changing the timer parameter value is reduced. In the third embodiment, description will be given about the configuration of the communication apparatus 10 according to the third embodiment and the flow of processing by the communication apparatus 10, followed by advantages of the third embodiment.

[Configuration of Communication Apparatus According to Third Embodiment]

Figure 11:
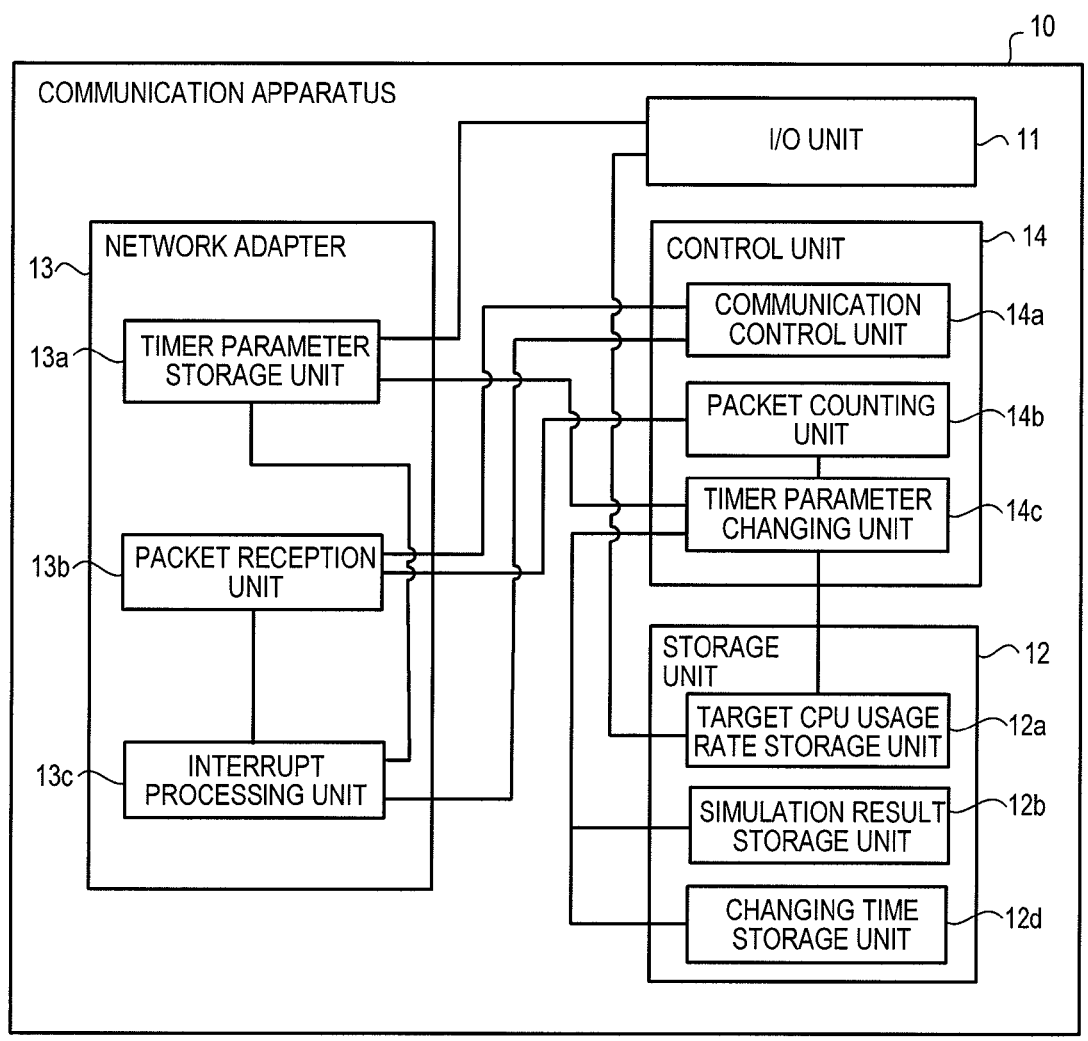
FIG. 11 is a block diagram showing the configuration of the communication apparatus according to a third embodiment.

First, the configuration of the communication apparatus 10 according to the third embodiment will be described. FIG. 11 is a block diagram showing the configuration of the communication apparatus according to the third embodiment. Besides additionally including a changing time storage unit 12d, the configuration of the communication apparatus 10 according to the third embodiment differs from the communication apparatus 10 according to the first embodiment in the points to be described below.

That is, the changing time storage unit 12d stores the time at which the timer parameter value was changed. Specifically, the changing time storage unit 12d stores the time at which the timer parameter changing unit 14c overwrote the timer parameter value stored in the timer parameter storage unit 13a with the determined timer parameter value.

The timer parameter changing unit 14c determines whether or not a predetermined time has passed since the last time the timer parameter value was changed. If the timer parameter changing unit 14c determines that the predetermined time has not passed, it stops changing the timer parameter value.

Specifically, the timer parameter changing unit 14c determines whether or not the timer parameter value stored in the timer parameter storage unit 13a is equal to the determined timer parameter value. If not, the timer parameter changing unit 14c reads the time at which the timer parameter value was changed from the changing time storage unit 12d.

The timer parameter changing unit 14c determines whether or not a predetermined time (e.g., 100 times the time required for the re-initialization at the hardware level) has passed since the timer parameter value was changed. If the timer parameter changing unit 14c determines that the predetermined time has passed since the timer parameter value was changed, it overwrites the timer parameter value stored in the timer parameter storage unit 13a with the determined timer parameter value, and overwrites the time stored in the changing time storage unit 12d with the time at which the timer parameter value to be set was determined (i.e., the time at which this processing is being performed).

If the timer parameter changing unit 14c determines that the predetermined time has not passed since the timer parameter value was changed, it stops changing the timer parameter value and causes the packet counting unit 14b to change the cumulative number of received packets to "0" and to resume counting the number of received packets.

[Timer Parameter Changing Processing by Communication Apparatus According to Third Embodiment]

Figure 12:
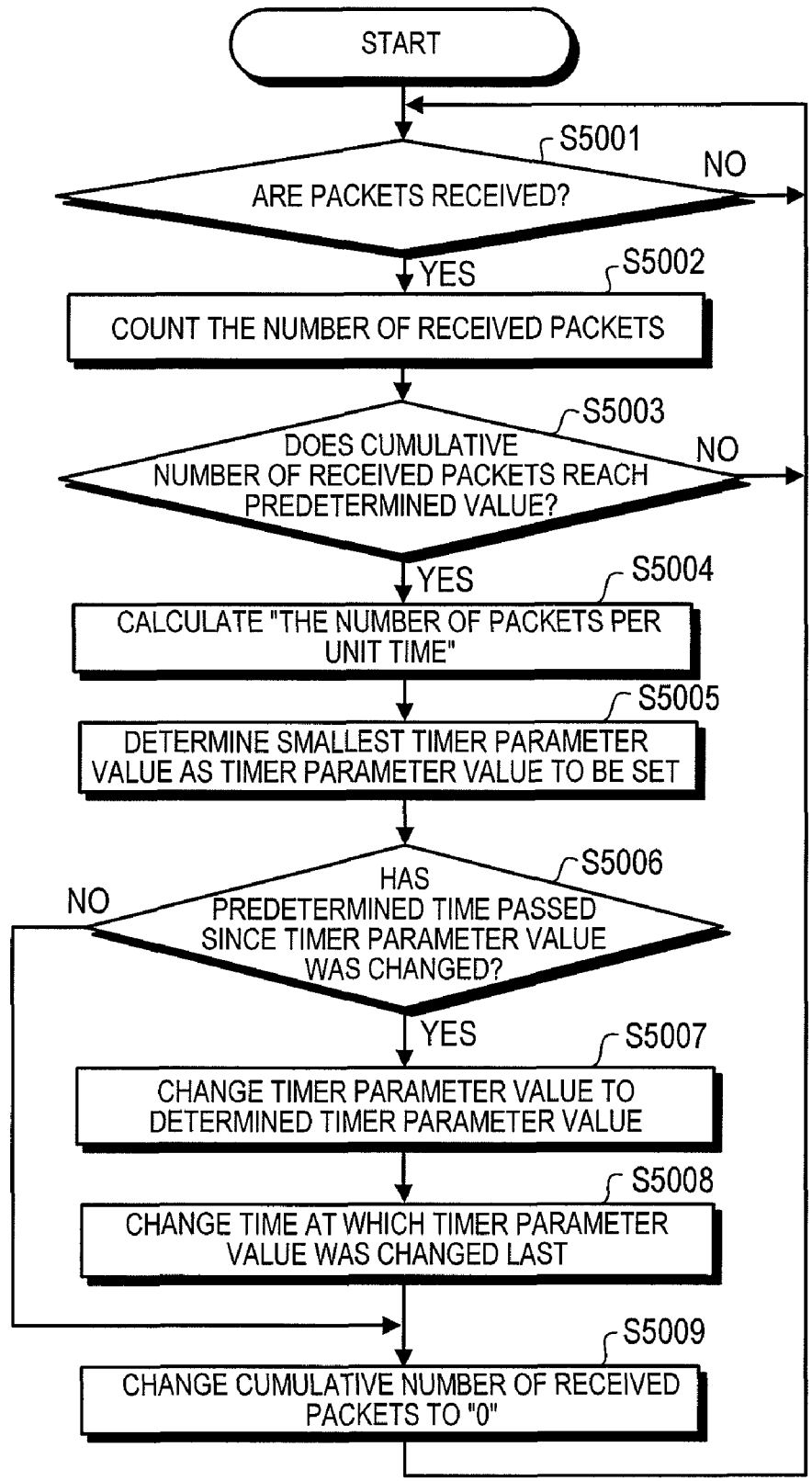
FIG. 12 is a flowchart showing the flow of the timer parameter changing processing by the communication apparatus according to the third embodiment.

Now, the timer parameter changing processing by the communication apparatus 10 according to the third embodiment will be described with reference to FIG. 12. FIG. 12 is a flowchart showing the flow of the timer parameter changing processing by the communication apparatus according to the third embodiment. In the following description, differences from the timer parameter changing processing by the communication apparatus 10 according to the first embodiment will be described in detail.

As shown in FIG. 12, when the communication apparatus 10 receives packets from outside the communication apparatus 10 (Yes in step S5001), it counts the number of received packets (step S5002). If the cumulative number of received packets does not reach a predetermined value (No in step S5003), the communication apparatus 10 again waits for reception of packets (step S5001).

If the cumulative number of received packets reaches the predetermined value (Yes in step S5003), the communication apparatus 10 calculates "the number of packets per unit time" (step S5004) and determines, as the timer parameter value to be set, the smallest one of timer parameter values corresponding to CPU usage rates lower than the target CPU usage rate (step S5005).

The communication apparatus 10 determines whether or not a predetermined time has passed since the last time the timer parameter value was changed (step S5006). Specifically, the timer parameter changing unit 14c reads the time at which the timer parameter value was changed from the changing time storage unit 12d and determines whether or not the predetermined time has passed since the last time the timer parameter value was changed.

If the communication apparatus 10 determines that the predetermined time has passed since the timer parameter value was changed (Yes in step S5006), it changes the timer parameter value to the determined timer parameter value (step S5007) and overwrites the time at which the timer parameter value was changed last with the time at which this processing is being performed (step S5008). Specifically, the timer parameter changing unit 14c overwrites the timer parameter value stored in the timer parameter storage unit 13a with the determined timer parameter value, and overwrites the time stored in the changing time storage unit 12d with the time at which the timer parameter value to be set was determined.

The communication apparatus 10 changes the counted cumulative number of received packets to "0" (step S5009) and again waits for reception of packets (step S5001).

Returning to step S5006, if the communication apparatus 10 determines that the predetermined time has not passed since the timer parameter value was changed (No in step S5006), it changes the counted cumulative number of received packets to "0" (step S5009) and again waits for reception of packets (step S5001).

Advantages of Third Embodiment

As described above, according to the third embodiment, the speed of response to packet reception can be increased without causing degradation in the network performance.

Fourth Embodiment

While the first to third embodiments have been described, the present invention may also be implemented in various different forms other than the above-described embodiments. Thus, other embodiments will be described below as a fourth embodiment.

For example, in the first embodiment, the case has been described where the timer parameter value is changed in response to the cumulative number of received packets reaching the predetermined value. However, when packets received per predetermined time are extremely few, it takes a long time for the cumulative number of received packets to reach the predetermined value.

In this case, the present invention may be applied in such a manner that "the number of packets per unit time" is calculated as the counting result in response to the lapse of a predetermined time and then the timer parameter value is changed.

Also, in the first embodiment, the case has been described where the smallest one of timer parameter values corresponding to CPU usage rates identified as lower than the target CPU usage rate is determined as the timer parameter value to be set. However, the present invention is not limited to it. Rather, the present invention may be applied to any cases where the timer parameter value is changed to a value reflecting the counting result of the packet counting unit 14b and the CPU usage rate, based on a simulation result.

That is, timer parameter values set based on a simulation result may be stored in the simulation result storage unit 12b in association with packet quantity ranges per unit time defined at predetermined intervals (see FIG. 13), and a timer parameter value corresponding to the counting result of the packet counting unit 14b may be determined as the timer parameter value to be set. FIG. 13 is a diagram showing exemplary information stored in the simulation result storage unit according to the fourth embodiment.

(Apparatus Configuration Etc.)

The processing steps, control steps, specific names, and information including various data and parameters (e.g., the stored information shown in FIGS. 3, 7, and 13, and the parameters shown in FIG. 8) illustrated in the above description and shown in the drawings may be arbitrarily modified unless otherwise specified.

The elements of each apparatus shown are conceptual with respect to their function and not necessarily have to be physically configured as shown. That is, the specific form of distribution and integration of each apparatus is not limited to the form shown, and all or some of them may be functionally or physically distributed or integrated in any unit depending on various loads and usage situations. For example, the packet counting unit 14b and the timer parameter changing unit 14c shown in FIG. 2 may be integrated.

Further, all or any part of processing functions performed in each apparatus may be implemented by a CPU and programs interpreted and executed by the CPU, or may be implemented as wired logic based hardware.

(Communication Programs)

Figure 14:
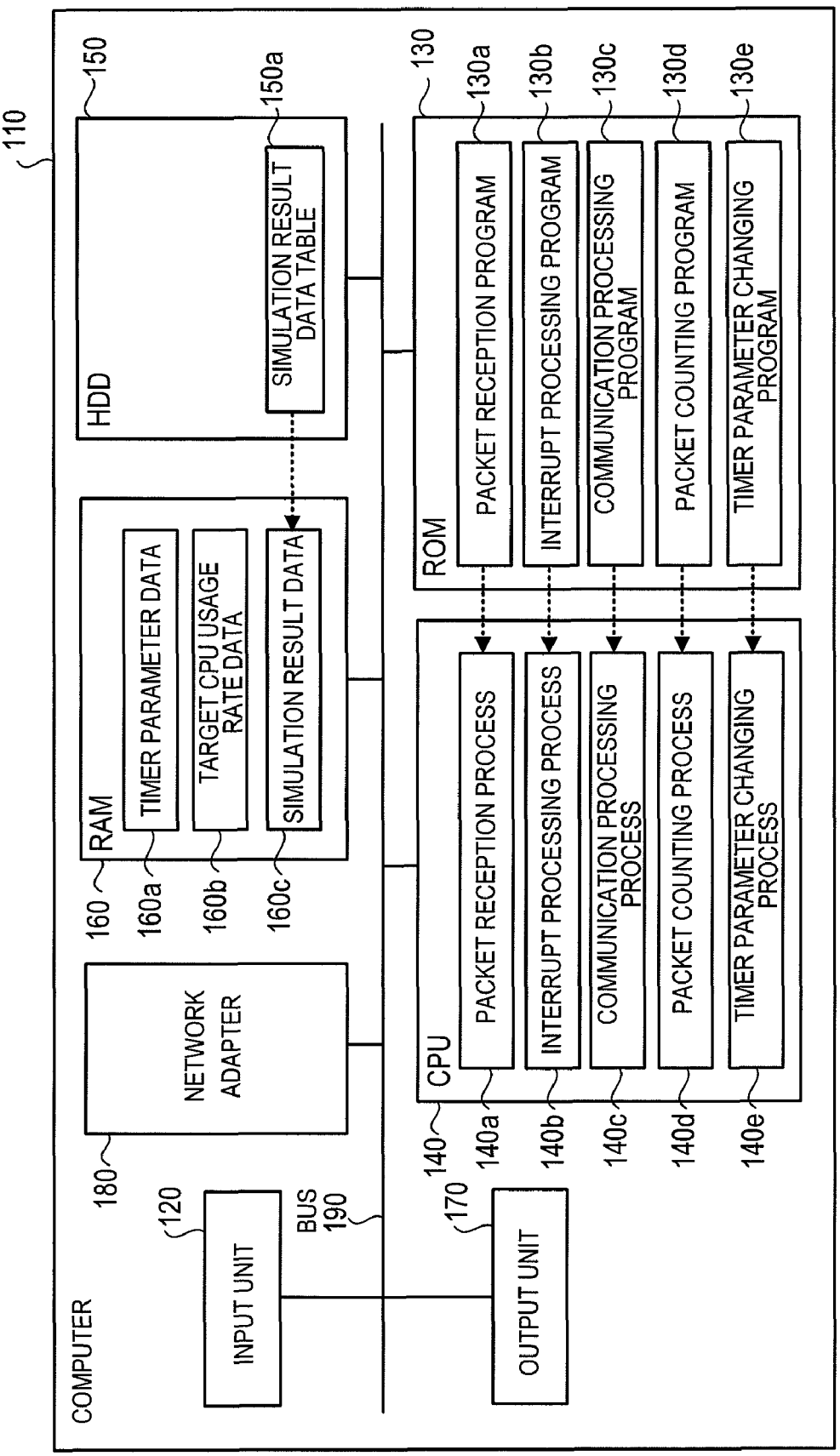
FIG. 14 is a diagram showing a computer that executes communication programs.

The present invention may be implemented by executing prepared programs in a computer serving as the communication apparatus 10. In the following description, with reference to FIG. 14, a computer that executes communication programs having the same functions as the communication apparatus 10 illustrated in the above embodiments will be described as an example. FIG. 14 is a diagram showing a computer that executes the communication programs.

As shown in FIG. 14, the computer 110 serving as the communication apparatus 10 is configured in such a manner that an input unit 120, a ROM 130, a CPU 140, an HDD 150, a RAM 160, an output unit 170, and a network adapter 180 are connected via a bus 190 or the like.

The ROM 130 stores in advance communication programs that exert the same functions as the communication apparatus 10 illustrated in the above-described first embodiment, that is, a packet reception program 130a, an interrupt processing program 130b, a communication processing program 130c, a packet counting program 130d, and a timer parameter changing program 130e as shown in FIG. 14. As with the elements of the communication apparatus 10 shown in FIG. 2, these programs 130a to 130e may be integrated or distributed as appropriate.

These programs 130a to 130e are read out from the ROM 130 and executed by the CPU 140, so that they function as a packet reception process 140a, an interrupt processing process 140b, a communication processing process 140c, a packet counting process 140d, and a timer parameter changing process 140e as shown in FIG. 14. The processes 140a to 140e correspond to the packet reception unit 13b, the interrupt processing unit 13c, the communication control unit 14a, the packet counting unit 14b, and the timer parameter changing unit 14e as shown in FIG. 2, respectively.

The HDD 150 is provided with a simulation result data table 150a as shown in FIG. 14. The simulation result data table 150a corresponds to the simulation result storage unit 12b shown in FIG. 2. The CPU 140 stores timer parameter data 160a and target CPU usage rate data 160b received via the input unit 120 in the RAM 160, and stores simulation result data 160c in the RAM 160 by reading it from the simulation result data table 150a. The CPU 140 performs processing based on the timer parameter data 160a, the target CPU usage rate data 160b, and the simulation result data 160c stored in the RAM 160.

The above programs 130a to 130e are not necessarily have to be stored in the ROM 130 in advance but may be stored in, for example, "portable physical media" such as a flexible disk (FD), CD-ROM, DVD disk, magneto-optical disk, and IC card inserted into the computer 110, as well as "nonremovable physical media" such as an HDD internally or externally provided to the computer 110, or even "other computers (or servers)" connected to the computer 110 via a public line, the Internet, a LAN, a WAN or the like, so that the computer 110 may read out the programs from the media or computers and execute the programs.

What is claimed is:

1. A computer-readable recording medium having recorded thereon a communication program that causes a computer to perform communication processing of received packets in response to reception of interrupt processing, the interrupt processing being performed by a network adapter as a packet reception notification after the lapse of a predetermined holding time has elapsed, wherein the communication program causes the computer to perform:

a packet counting process of counting the number of received packets received by the network adapter per unit time and generating a counting result;

a parameter value changing process of changing, based on the counting result of the packet counting process, a timer parameter value for determining the holding time; and a CPU usage rate calculation process of calculating the CPU usage rate for each parameter value based on the counting result of the packet counting process, a preset communication processing time required for the communication processing, and a preset interrupt processing time required for the interrupt processing, wherein the parameter value changing process changes the timer parameter value based on a calculation result of the CPU usage rate calculation process.

2. A computer-readable recording medium having recorded thereon a communication program that causes a computer to perform communication processing of received packets in response to reception of interrupt processing, the interrupt processing being performed by a network adapter as a packet reception notification after the lapse of a predetermined holding time has elapsed, wherein the communication program causes the computer to perform:

a packet counting process of counting the number of received packets received by the network adapter per unit time and generating a counting result;

a parameter value changing process of changing, based on the counting result of the packet counting process, a timer parameter value for determining the holding time; and a simulation result storage process of performing a simulation in which a CPU usage rate for each of varied timer parameter values is measured for each of packet quantity ranges defined at predetermined intervals, and of storing the CPU usage rate for each timer parameter value as a simulation result in a storage unit in association with each packet quantity range, wherein based on the simulation result stored by the simulation result storage process, the parameter value changing process changes the timer parameter value to a value reflecting the counting result of the packet counting process and the CPU usage rate.

3. The computer-readable recording medium having recorded thereon the communication program according to claim 1, wherein the parameter value changing process changes the timer parameter value to a smaller value if the counting result of the packet counting process is smaller than a preset target number of packets to be processed per unit time, and changes the timer parameter value to a larger value if the counting result of the packet counting process is larger than the preset target number of packets.

4. The computer-readable recording medium having recorded thereon the communication program according to claim 1, wherein the parameter value changing process determines whether or not a predetermined time has passed since the last time the timer parameter value was changed, and if it is determined that the predetermined time has not passed, stops changing the timer parameter value.

5. A communication apparatus that performs communication processing of received packets in response to reception of interrupt processing, the interrupt processing being performed by a network adapter as a packet reception notification after a predetermined holding time has elapsed, the apparatus comprising:

packet counting means for counting the number of received packets received by the network adapter per unit time and generating a counting result;

parameter value changing means for changing, based on the counting result of the packet counting means, a timer parameter value for determining the holding time; and simulation result storage means for performing a simulation in which a CPU usage rate for each of varied timer parameter values is measured for each of packet quantity ranges defined at predetermined intervals, and for storing the CPU usage rate for each timer parameter value as a simulation result in a storage unit in association with each packet quantity range, wherein based on the simulation result stored by the simulation result storage means, the parameter value changing means changes the timer parameter value to a value reflecting the counting result of the packet counting means and the CPU usage rate.

6. The computer-readable recording medium having recorded thereon the communication program according to claim 2, wherein the parameter value changing process changes the timer parameter value to a smaller value if the counting result of the packet counting process is smaller than a preset target number of packets to be processed per unit time, and changes the timer parameter value to a larger value if the counting result of the packet counting process is larger than the preset target number of packets.

7. The computer-readable recording medium having recorded thereon the communication program according to claim 2, wherein the parameter value changing process determines whether or not a predetermined time has passed since the last time the timer parameter value was changed, and if it is determined that the predetermined time has not passed, stops changing the timer parameter value.

8. A communication apparatus that performs communication processing of received packets in response to reception of interrupt processing, the interrupt processing being performed by a network adapter as a packet reception notification after a predetermined holding time has elapsed, the apparatus comprising:

packet counting means for counting the number of received packets received by the network adapter per unit time and generating a counting result;

parameter value changing means for changing, based on the counting result of the packet counting means, a timer parameter value for determining the holding time; and a CPU usage rate calculation means for calculating the CPU usage rate for each parameter value based on the counting result of the packet counting process, a preset communication processing time required for the communication processing, and a preset interrupt processing time required for the interrupt processing, wherein the parameter value changing means changes the timer parameter value based on a calculation result of the CPU usage rate calculation means.

* * * * *